United States Patent
Kwon

(10) Patent No.: US 10,045,272 B2
(45) Date of Patent: Aug. 7, 2018

(54) METHOD FOR CONNECTING TO ACCESS POINT IN WLAN SYSTEM AND ELECTRONIC DEVICE THEREOF

(71) Applicant: Samsung Electronics Co., Ltd., Gyeonggi-do (KR)

(72) Inventor: Soon-Hyun Kwon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/915,453

(22) PCT Filed: Aug. 26, 2014

(86) PCT No.: PCT/KR2014/007929
§ 371 (c)(1),
(2) Date: Feb. 29, 2016

(87) PCT Pub. No.: WO2015/030463
PCT Pub. Date: Mar. 5, 2015

(65) Prior Publication Data
US 2016/0219485 A1 Jul. 28, 2016

(30) Foreign Application Priority Data
Aug. 28, 2013 (KR) .................. 10-2013-0102264

(51) Int. Cl.
*H04W 36/32* (2009.01)
*H04W 48/20* (2009.01)
*H04W 84/12* (2009.01)

(52) U.S. Cl.
CPC .......... *H04W 36/32* (2013.01); *H04W 48/20* (2013.01); *H04W 84/12* (2013.01)

(58) Field of Classification Search
CPC ..... H04W 36/30; H04W 36/32; H04W 48/20; H04W 4/04; H04W 60/06; H04W 64/00;
(Continued)

(56) References Cited

U.S. PATENT DOCUMENTS 9,479,990 B1 * 10/2016 Chen .................. H04W 36/30
2005/0246334 A1 * 11/2005 Tao ..................... H04W 64/00
(Continued)

FOREIGN PATENT DOCUMENTS

KR 1020090002363 1/2009
KR 1020090118463 11/2009
(Continued)

OTHER PUBLICATIONS

PCT/ISA/237 Written Opinion issued on PCT/KR2014/007929 (pp. 4).
PCT/ISA/210 Search Report issued on PCT/KR2014/007929 (pp. 3).

*Primary Examiner* — Thai Vu
(74) *Attorney, Agent, or Firm* — The Farrell Law Firm, P.C.

(57) ABSTRACT

The present invention relates to a method for controlling an Access Point (AP) connection and an electronic device thereof. A method of controlling an AP connection by an AP controller includes detecting a movement of an electronic device which is connected to a first AP, determining an AP which is the closest to the detected electronic device, and, when the determined AP is different from the first AP, releasing the connection between the electronic device and the first AP to make the electronic device connect to the determined AP. Accordingly, the present invention has an effect in that the AP controller can provide a proper service in accordance with a position of the electronic device.

12 Claims, 12 Drawing Sheets

(58) Field of Classification Search
CPC . H04W 76/064; H04W 84/12; H04W 64/003; H04W 4/025; H04W 40/20; G06F 17/30386
USPC ........ 455/436–444, 404.2, 414.2, 456.1–457
See application file for complete search history.

(56) References Cited

U.S. PATENT DOCUMENTS

| | | |
|---|---|---|
| 2006/0251256 A1 | 11/2006 | Asokan et al. |
| 2008/0261622 A1* | 10/2008 | Lee ................. G01S 5/0205 455/456.2 |
| 2009/0147697 A1* | 6/2009 | Malik ................. H04W 48/08 370/254 |
| 2012/0330594 A1 | 12/2012 | Lee et al. |
| 2013/0053061 A1 | 2/2013 | Kang et al. |
| 2013/0183950 A1 | 7/2013 | Hwang |
| 2014/0073287 A1* | 3/2014 | Zhang ................. H04W 74/00 455/411 |
| 2014/0293795 A1* | 10/2014 | Xiao ................. H04W 28/0215 370/236 |

FOREIGN PATENT DOCUMENTS

| | | |
|---|---|---|
| KR | 1020120120807 | 11/2012 |
| KR | 1020130000089 | 1/2013 |
| KR | 1020130022885 | 3/2013 |
| KR | 1020130084464 | 7/2013 |
| KR | 1020130091082 | 8/2013 |

* cited by examiner

METHOD FOR CONNECTING TO ACCESS POINT IN WLAN SYSTEM AND ELECTRONIC DEVICE THEREOF

BACKGROUND OF THE INVENTION

1. Field of the Invention

The present invention relates to an electronic device, and in particular, to a method and apparatus for controlling a connection between the electronic device and an Access Point (AP) by an AP controller in a Wireless Local Area Network (WLAN).

2. Description of the Related Art

When a terminal intends to have access to an Access Point (AP) in a Wireless Local Area Network (WLAN) (e.g., a Wireless Fidelity (Wi-Fi) system), the terminal discovers Basic Service Set IDentifiers (BSSIDs) of neighboring WLAN APs. Thereafter, the terminal provides a list of the discovered APs to a user, and the user selects a BSSID to be used from the provided list. In this case, a WLAN connection program included in an electronic device may select an AP having the greatest output from among APs which serve the BSSID selected by the user to have access to the selected AP.

In general, if the user directly selects the AP, it is equivalent to not using the BSSID. Therefore, in most cases, the terminal does not have a WLAN connection program which allows the user to directly select the AP. Therefore, in case of a conventional terminal, the user cannot directly select a desired AP.

Meanwhile, if detection strength of a currently accessed AP is decreased to be less than or equal to a threshold, the terminal performs a reconnection by discovering an AP having the greatest received signal strength from among APs having the same BSSID as a BSSID of the currently accessed AP.

Accordingly, if the terminal has access to a specific AP, although it is more effective to have access to a different AP other than the currently accessed AP when considering an output value or the like of the terminal, the terminal does not discover the different AP until signal reception strength of the currently accessed AP is decreased to be less than or equal to the threshold. Further, although the terminal needs to have access to a new AP due to a positional movement of the terminal, if detection strength of the accessed AP is not decreased to be less than or equal to the threshold, the terminal cannot have access to the new AP. That is, in case of using the conventional AP access scheme, a situation occurs in which the terminal cannot receive a proper service in accordance with a position of the terminal.

Therefore, there is a need to provide a method in which a terminal can receive a proper service in accordance with a position of the terminal when the position of the terminal is changed.

SUMMARY OF THE INVENTION

Accordingly, an exemplary embodiment of the present invention provides a method and apparatus for controlling a connection between an electronic device and an Access Point (AP) by an AP controller.

Another exemplary embodiment of the present invention provides a method and apparatus for connecting an electronic device to an AP closest to a position of the electronic device by an AP controller.

Another exemplary embodiment of the present invention provides a method and apparatus for calculating a distance between an electronic device and each AP by an AP controller.

Another exemplary embodiment of the present invention provides a method and apparatus for maintaining or releasing a connection between an electronic device and an AP to which the electronic device is currently connected, by comparing the AP with an AP closest to a position of the electronic device by an AP controller.

According to an exemplary embodiment of the present invention, a method of controlling an AP connection by an AP controller includes detecting a movement of an electronic device currently connected to a first AP, determining an AP closest to a position of the detected electronic device, and if the determined AP is different from the first AP, releasing a connection between the electronic device and the first AP to make the electronic device connect to the determined AP.

According to an exemplary embodiment of the present invention, an AP controller apparatus for controlling an AP connection includes a position detection unit for detecting a movement of an electronic device currently connected to a first AP, and for determining an AP closest to a position of the detected electronic device, and an AP connection control unit for releasing a connection between the electronic device and the first AP to make the electronic device connect to the determined AP, if the determined AP is different from the first AP.

DETAILED DESCRIPTION OF EXEMPLARY EMBODIMENTS

Exemplary embodiments of the present invention will be described herein below with reference to the accompanying drawings. In the following description of the present invention, well-known functions or constructions are not described in detail since they would obscure the invention in unnecessary detail. Also, the terms used herein are defined according to the functions of the present invention. Thus, the terms may vary depending on user's or operator's intension and usage. That is, the terms used herein must be understood based on the descriptions made herein.

It is assumed hereinafter that an Access Point (AP) controller manages and controls all APs included in an AP set consisting of a plurality of APs for providing a Wireless Local Area Network (WLAN) service. Hereinafter, an electronic device may be a mobile terminal (e.g., a smart phone and a tablet Personal Computer (PC)) capable of Wireless Fidelity (WiFi) communication.

Figure 1:
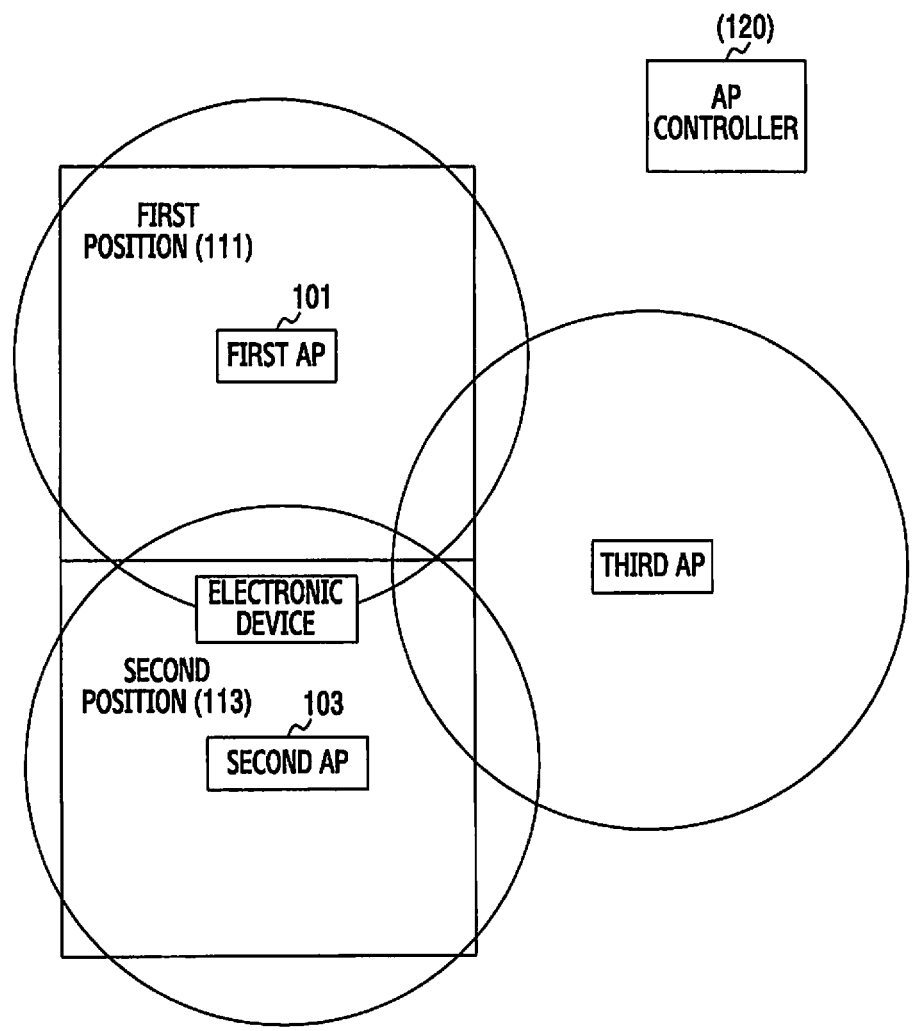
FIG. 1 illustrates an example of controlling an Access Point (AP) connection by an AP controller in accordance with a position of an electronic device according to an exemplary embodiment of the present invention.

FIG. 1 illustrates an example of controlling an AP connection by an AP controller in accordance with a position of an electronic device according to an exemplary embodiment of the present invention.

Referring to FIG. 1, the AP controller may manage and control one or more APs for providing a wireless communication service. Further, each of the APs may be connected to one or more electronic devices (or terminals) capable of wireless communication to provide a wireless communication service to each of the electronic devices.

First, conventionally, when an electronic device connected to a first AP is moved from a first position to a second position, since signal strength of the first AP is persistently maintained to be greater than or equal to a threshold, the electronic device maintains the connection with the first AP even though there is a need to connect to a second AP which exists in the second position.

However, in a WLAN system according to an exemplary embodiment of the present invention, an AP controller may detect a movement of an electronic device to control at least one AP to make the electronic device connect to an AP corresponding to a position to which the electronic device is moved. For example, when an electronic device connected to a first AP is moved from a first position to a second position, the AP controller detects the movement of the electronic device, and discovers an AP closest to the position to which the electronic device is moved. Thereafter, the AP controller may confirm that the AP closest to the position to which the electronic device is moved is a second AP, and may control the AP to connect the electronic device and the second AP closest to the position of the electronic device.

As described above, in the WLAN system according to the exemplary embodiment of the present invention, the AP controller may provide a position-based service under the necessity of an operator by controlling a connection between the electronic device and the AP on the basis of the position of the electronic device. For example, if a first position 111 in which a first AP 101 is installed is a lounge and a second position 113 in which a second AP 103 is installed is a meeting room, the operator can smoothly keep confidentiality regarding all meetings and tasks achieved in the second position 113. In this case, according to the exemplary embodiment of the present invention, the AP controller 120 may provide control such that electronic devices located in an area of the first position 111 have access to the first AP 101 and electronic devices located in an area of the second position 113 have access to the second AP 103, and thereafter may apply a strong security technique regarding signals transmitted/received via the second AP 103. In this manner, the confidentiality can be kept.

Figure 2:
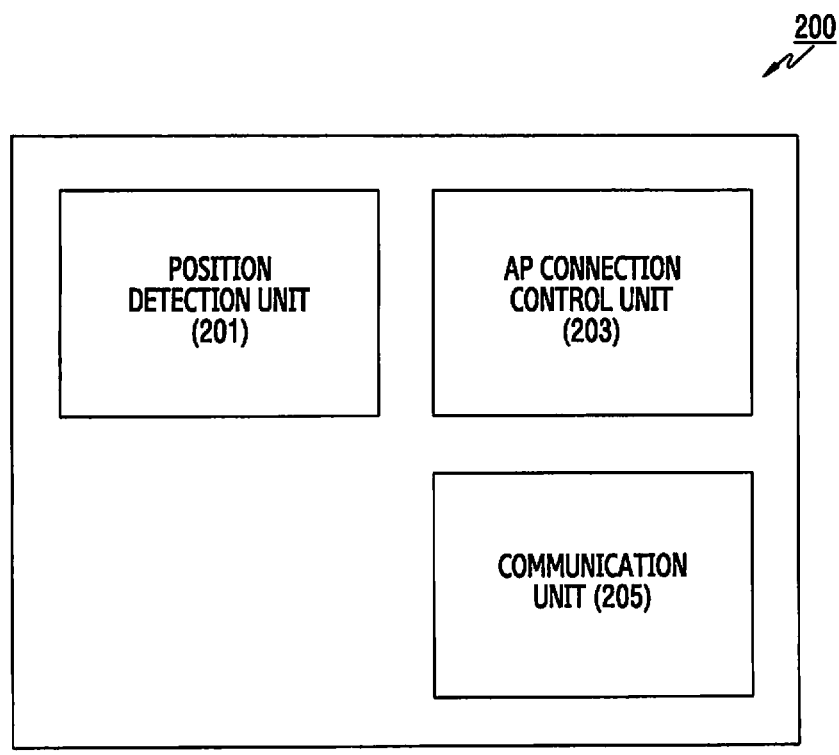
FIG. 2 is a block diagram of an AP controller for controlling an AP connection in accordance with a position of an electronic device in a Wireless Local Area Network (WLAN) system according to an exemplary embodiment of the present invention.

FIG. 2 is a block diagram of an AP controller for controlling an AP connection in accordance with a position of an electronic device in a Wireless Local Area Network (WLAN) system according to an exemplary embodiment of the present invention.

Referring to FIG. 2, an AP controller 200 includes a position detection unit 201, an AP connection control unit 203, and a communication unit 205.

The position detection unit 201 may detect the position of the electronic device currently connected to an AP which can be managed and controlled by the AP controller 200. In addition, the position detection unit 201 may detect a movement of the electronic device currently connected to the AP. For example, the position detection unit 201 may detect a position of an electronic device currently connected to a first AP which can be managed and controlled by the AP controller 200, and may detect that the electronic device is moved from a first position to a second position.

In addition, the position detection unit 201 may determine an AP closest to the position of the electronic device. In other words, the position detection unit 201 may detect the position of the electronic device, and may determine the AP closest to the position of the detected electronic device. In addition, when the electronic device is moved, the position detection unit 201 may determine an AP closest to a position to which the electronic device is moved. For example, the position detection unit 201 may determine that an AP closest to the electronic device in the first position is the first AP. Thereafter, if the electronic device is moved from the first position to the second position, the position detection unit 201 may determine that an AP closest to the second position to which the electronic device is moved is a second AP. In this case, the position detection unit 201 may estimate a distance between at least three APs and the electronic device 300 by using received signal strength of the electronic device 300, which is measured by the at least three APs, and may estimate a coordinate indicating the position of the electronic device on the basis of the estimated distance, thereby determining a certain AP closest to the electronic device 300 among the three APs. Herein, a scheme of estimating a position coordinate of the electronic device 300 will be described below in detail with reference to equations.

According to a design method, the aforementioned position detection unit 201 may be provided inside the AP controller 200 or may exist in a form of an additional independent server.

The AP connection control unit 203 may control a function for connecting the electronic device and an AP closest to the position of the electronic device. First, the AP connection control unit 203 confirms an AP currently connected to the electronic device, and thus confirms whether the AP is the AP closest to the position of the electronic device. If the AP is not the AP closest to the position of the electronic device, the AP connection control unit 203 may control a function for transmitting a connection release message to the AP to release the connection. In this case, the AP connection control unit 203 may transmit the connection release message by including IDentifier (ID) information of an electronic device of which a connection with the AP must be released among one or more electronic devices connected to the AP.

Thereafter, the AP connection control unit 203 may confirm whether information indicating that a connection is made to an electronic device is received from a plurality of APs which can be managed and controlled by the AP controller 200, and thus may control the electronic device to be connected to an AP closest to a position of the electronic device. Upon receiving the information indicating that the connection is made to the electronic device from the AP determined to be the closest to the position of the electronic device, the AP connection control unit 203 may maintain the connection between the AP and the electronic device. Otherwise, upon receiving information indicating that the connection is made to the electronic device from a different AP other than the AP determined to be the closest to the position of the electronic device, the AP connection control unit 203 may request the different AP to release the connection with the electronic device and thus may release the connection between the different AP and the electronic device. Thereafter, the AP connection control unit 203 confirms whether the information indicating that the connection is made to the electronic device is received from APs other than the connection-released AP. The AP connection control unit 203 according to the present invention repeats the aforementioned procedure until the information indicating that the connection is made to the electronic device is received from the AP determined to be the closest to the position of the electronic device.

The communication unit 205 may transmit/receive data with respect to an AP managed by the AP controller 200 and an electronic device registered to the AP. The communication unit 205 may include a radio frequency receiver and transceiver and/or an optical (e.g., infrared ray) receiver and transceiver. For example, the communication unit 205 may include a wireless communication system supporting any one of a Global System for Mobile Communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a Wireless Fidelity (Wi-Fi) network, a WiMax network, and/or a Bluetooth network. The wireless communication system according to the exemplary embodiment of the present invention is not limited to the wireless communication system supporting the aforementioned network, and thus may be a wireless communication system supporting other networks. The communication unit 205 according to the present invention may receive a message indicating that a connection is made to the electronic device from a specific AP among APs managed and controlled by the AP controller 200.

In addition, if the electronic device is connected to a different AP other than the AP determined to be the closest to the position of the electronic device, the communication unit 205 may transmit a connection release message to an AP currently connected to the electronic device to release the connection.

Figure 3:
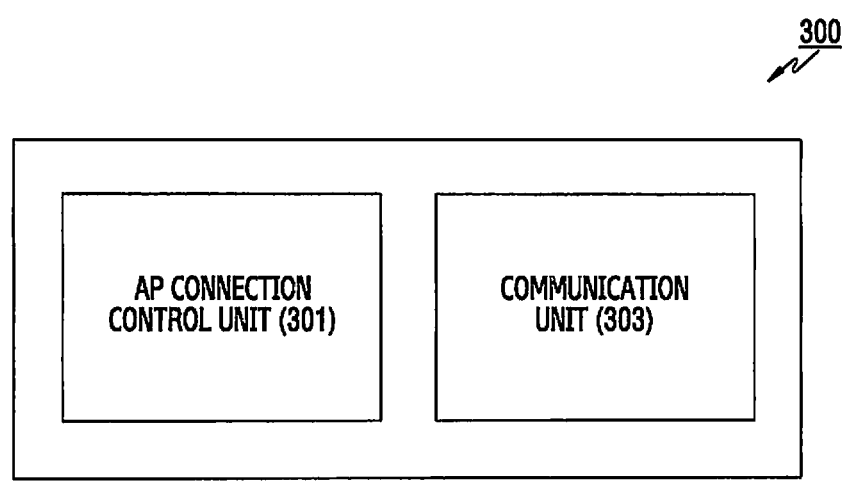
FIG. 3 is a block diagram of an electronic device for performing an AP connection under the control of an AP controller in a WLAN system according to an exemplary embodiment of the present invention.

FIG. 3 is a block diagram of an electronic device for performing an AP connection under the control of the AP controller 200 in a WLAN system according to an exemplary embodiment of the present invention.

Hereinafter, the electronic device may be a mobile terminal (e.g., a smart phone and a tablet Personal Computer (PC)) capable of WiFi communication.

Referring to FIG. 3, an electronic device 300 includes an AP connection control unit 301 and a communication unit 303.

When a connection with a currently connected AP is released under the control of the AP controller 200, the AP connection control unit 301 may discover one or more neighboring APs and may perform a connection with an AP having the greatest signal strength among the discovered APs. If the connection with the currently connected AP is released again under the control of the AP controller 200 after performing the connection with the AP having the greatest signal strength, the AP connection control unit 301 may perform a connection by discovering the AP having the greatest signal strength from among different APs other than the connection-released AP.

The communication unit 303 may transmit/receive data with respect to the AP controller 200 and the AP. The communication unit 303 may include a radio frequency receiver and transceiver and/or an optical (e.g., infrared ray) receiver and transceiver. For example, the communication unit 303 may include a wireless communication system supporting any one of a Global System for Mobile Communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a Wireless Fidelity (Wi-Fi) network, a WiMax network, and/or a Bluetooth network. The wireless communication system according to the exemplary embodiment of the present invention is not limited to the wireless communication system supporting the aforementioned network, and thus may be a wireless communication system supporting other networks. The communication unit 303 according to the present invention may perform a function for connecting to an AP which outputs the greatest signal strength among APs capable of detecting signals.

Figure 4:
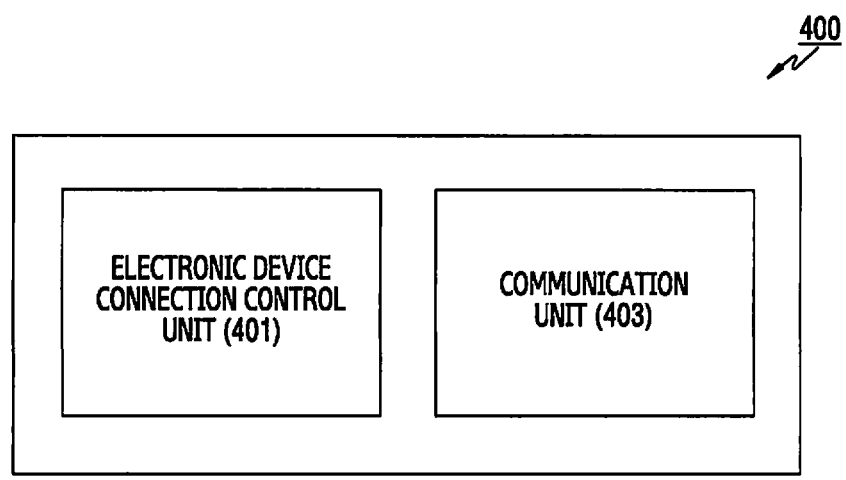
FIG. 4 is a block diagram of an AP for performing an AP connection under the control of an AP controller in a WLAN system according to an exemplary embodiment of the present invention.

FIG. 4 is a block diagram of an AP for performing an AP connection under the control of the AP controller 200 in a WLAN system according to an exemplary embodiment of the present invention.

Referring to FIG. 4, the AP according to the present invention includes an electronic device connection control unit 401 and a communication unit 403.

The electronic device connection control unit 401 may receive a connection release message from the AP controller 200, and may release a connection with the currently connected electronic device 300. In other words, upon receiving the connection release message from the AP controller 200, the electronic device connection control unit 401 may confirm electronic device's ID information included in the connection release message, and may release a connection with an electronic device corresponding to the ID information. Herein, the AP may release the connection with the electronic device by using connection release schemes which are well-known to those ordinarily skilled in the art. For example, the AP may release the connection with the electronic device by using a scheme of deleting information related to the electronic device, and may release the connection with the electronic device by using a scheme of decreasing transmission power. It is also possible to use various other connection releasing schemes.

After detecting the connection with the electronic device 300, the electronic device connection control unit 401 may confirm an ID of the detected electronic device 300, and may transmit the confirmed ID information of the electronic device 300 to the AP controller 200. For example, the electronic device connection control unit 401 may detect that the AP is connected to a first electronic device, may confirm an ID of the first electronic device of which a connection is detected, and thereafter may transmit ID information of the first electronic device to the AP controller 200.

The communication unit 403 may transmit/receive data with respect to the AP controller 200 and one or more electronic devices 300 capable of wireless communication. The communication unit 403 may include a radio frequency receiver and transceiver and/or an optical (e.g., infrared ray) receiver and transceiver. For example, the communication unit 403 may include a wireless communication system supporting any one of a Global System for Mobile Communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a Wireless Fidelity (Wi-Fi) network, a WiMax network, and/or a Bluetooth network. The wireless communication system according to the exemplary embodiment of the present invention is not limited to the wireless communication system supporting the aforementioned network, and thus may be a wireless communication system supporting other networks. The communication unit 403 according to the present invention may receive a connection release message from the AP controller 200 to provide a control to release a connection with the specific electronic device 300 among one or more electronic devices 300 connected to the AP.

In addition, the communication unit 403 may perform a connection with the electronic device 300 capable of wireless communication.

Figure 5A:
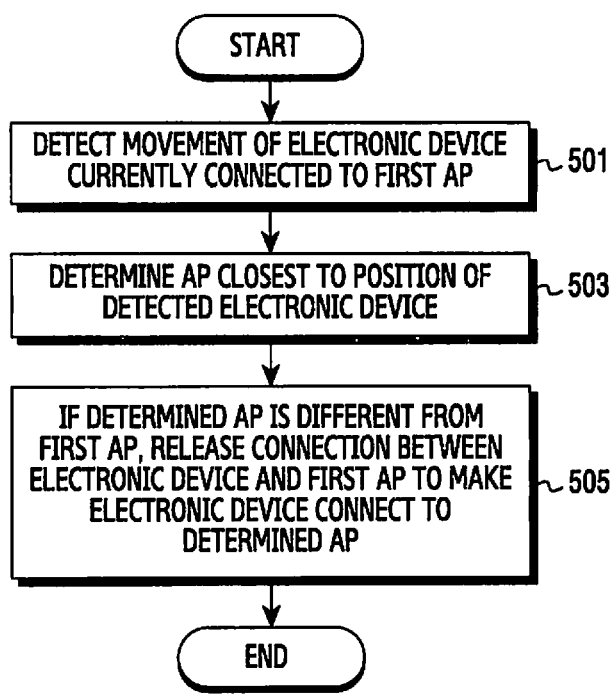
FIG. 5A illustrates a procedure of controlling an AP connection by an AP controller in accordance with a position of an electronic device according to an exemplary embodiment of the present invention.

FIG. 5A illustrates a procedure of controlling an AP connection by the AP controller 200 in accordance with a position of the electronic device 300 according to an exemplary embodiment of the present invention.

Referring to FIG. 5A, in step 501, the AP controller 200 may detect a movement of the electronic device 300 currently connected to a first AP. In other words, the AP controller 200 may detect a position of the electronic device 300 currently connected to an AP which can be managed and controlled by the AP controller 200, and may detect the movement of the electronic device 300. For example, the AP controller 200 may detect that the electronic device 300 is moved from a first position to a second position. Herein, the AP controller 200 may estimate a distance between at least three APs and the electronic device 300 by using received signal strength of the electronic device 300, which is measured by the at least three APs, and may estimate a coordinate indicating the position of the electronic device 300 on the basis of the estimated distance and thus detect that the electronic device 300 is moved from an area of a specific AP to an area or a different AP. For another exemplary embodiment, the AP controller may detect a positional movement of the electronic device 300 via an additional server for detecting the position of the electronic device 300.

Thereafter, in step 503, the AP controller 200 may determine an AP closest to the position of the detected electronic device 300. Specifically, upon detecting a movement of the electronic device 300, the AP controller 200 may determine an AP closest to a position of the moved electronic device 300.

Thereafter, in step 505, the AP controller 200 releases a connection between the electronic device 300 and the first AP to make the electronic device 300 connect to the determined AP if the determined AP is different from the first AP. Specifically, the AP controller 200 may confirm whether an AP currently connected to the electronic device 300 is the AP closest to the position of the electronic device 300, and if it is not the closest AP, may transmit a connection release message to the AP to release a connection between the electronic device 300 and the AP. Thereafter, the AP controller 200 receives from a different AP other than a connection-released AP a message for indicating that a connection is made to the electronic device 300, and confirms whether an AP which receives the message is the AP closest to the position of the electronic device 300, and if it is not the closest AP, releases a connection between the electronic device 300 and the AR The AP controller 200 may repeat the aforementioned procedure until the message for indicating that the connection is made to the electronic device is received from the AP closest to the position of the electronic device 300.

Thereafter, the AP controller 200 ends the procedure according to the exemplary embodiment of the present invention.

Figure 5B:
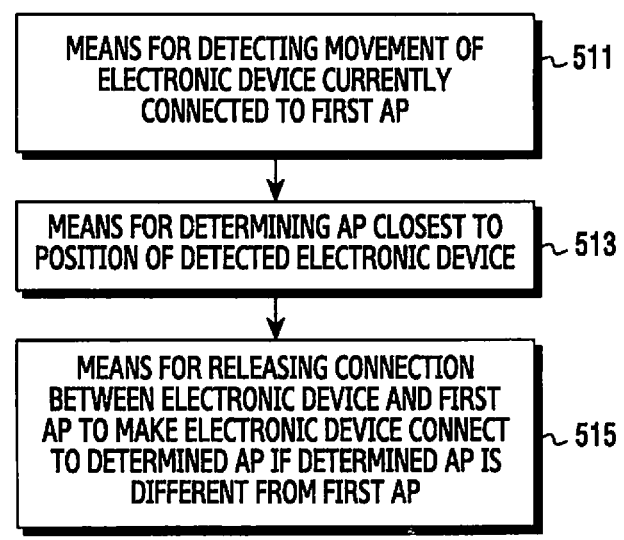
FIG. 5B illustrates a means by which an AP controller controls an AP connection in accordance with a position of an electronic device according to an exemplary embodiment of the present invention.

FIG. 5B illustrates a means by which the AP controller 200 controls an AP connection in accordance with a position of the electronic device 300 according to an exemplary embodiment of the present invention.

Referring to FIG. 5B, the AP controller 200 includes a means 511 for detecting a movement of the electronic device 300 currently connected to a first AP. In this case, the AP controller 200 may include a module for detecting the movement of the electronic device 300 currently connected to the AP to detect the movement of the electronic device 300, and according to a design method, may detect the movement of the electronic device 300 currently connected to the AP via an additional server.

In addition, the AP controller 200 includes a means 513 for determining an AP closest to the position of the detected electronic device 300. Specifically, the AP controller 200 may include a means for detecting a position of the electronic device 300 connected to the AP and a means for determining an AP closest to the position.

Further, the AP controller 200 includes a means 515 for releasing a connection between the electronic device 300 and the first AP to make the electronic device 300 connect to the determined AP if the determined AP is different from the first AP. In this case, the AP controller 200 may include a means for confirming whether the determined AP is identical to the AP currently connected to the electronic device 300. In addition, the AP controller 200 may include a means for confirming whether a message indicating that a connection is made to the electronic device 300 is received from different APs other than the AP after releasing the connection of the AP currently connected to the electronic device 300.

Figure 6:
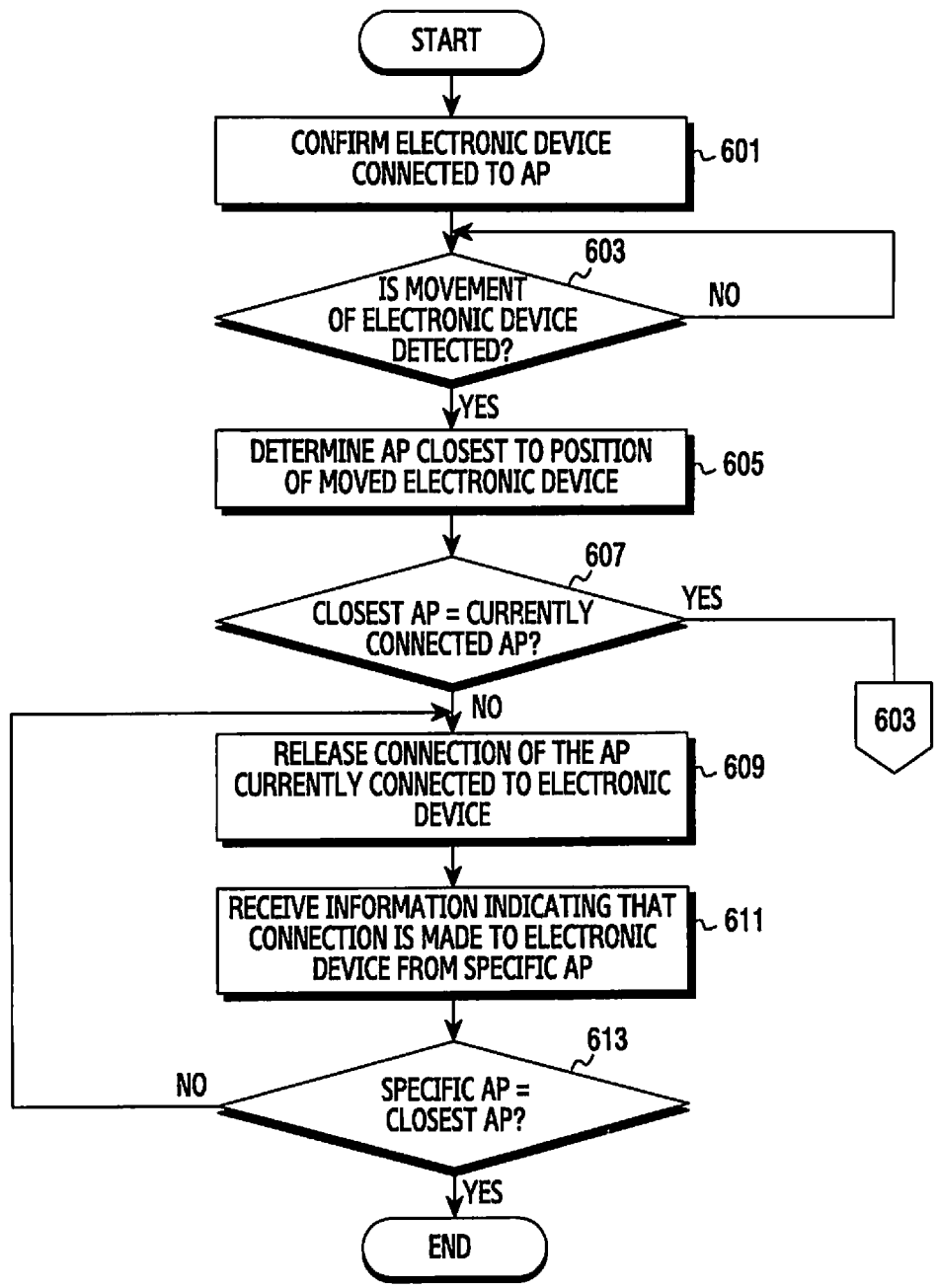
FIG. 6 illustrates a procedure of controlling an AP connection by an AP controller on the basis of signal strength of an AP in accordance with a position of an electronic device according to an exemplary embodiment of the present invention.

FIG. 6 illustrates a procedure of controlling an AP connection by an AP controller on the basis of signal strength of an AP in accordance with a position of an electronic device according to an exemplary embodiment of the present invention.

Referring to FIG. 6, in step 601, the AP controller 200 confirms the electronic device 300 connected to the AP. In other words, the AP controller 200 may confirm the electronic device 300 connected to the AP managed and controlled by the AP controller 200.

Thereafter, in step 603, the AP controller 200 confirms whether a movement of the electronic device 300 is detected. In this case, the AP controller 200 may include a module for detecting the movement of the electronic device 300 currently connected to the AP to detect the movement of the electronic device 300, and according to a design method, may receive position information of the electronic device 300 currently connected to the AP via an additional server. Further, the AP controller 200 may detect a positional movement of the electronic device 300 by periodically calculating a position coordinate of the electronic device 300 on the basis of equations to be described below.

Upon detecting the movement of the electronic device 300, proceeding to step 605, the AP controller 200 determines an AP closest to a position to which the electronic device 300 is moved. Specifically, the AP controller 200 may discover one or more APs for outputting a signal which can be received by the electronic device 300 in the position to which the electronic device 300 is moved, and may determine the AP closest to the position to which the electronic device 300 is moved among the discovered APs. For example, the AP controller 200 may discover three APs which have detected an uplink signal of the electronic device 300 on the basis of information reported from a plurality of APs, and may determine the AP closest to the electronic device 300 among the discovered three APs. Upon detecting the movement of the electronic device 300, the AP controller 200 may perform the AP discovery after a pre-defined time elapses from a time at which the movement of electronic device 300 is detected. Further, the AP controller 200 may calculate a distance of each AP from the position to which the electronic device 300 is moved on the basis of a pre-defined position tracking algorithm.

Figure 7:
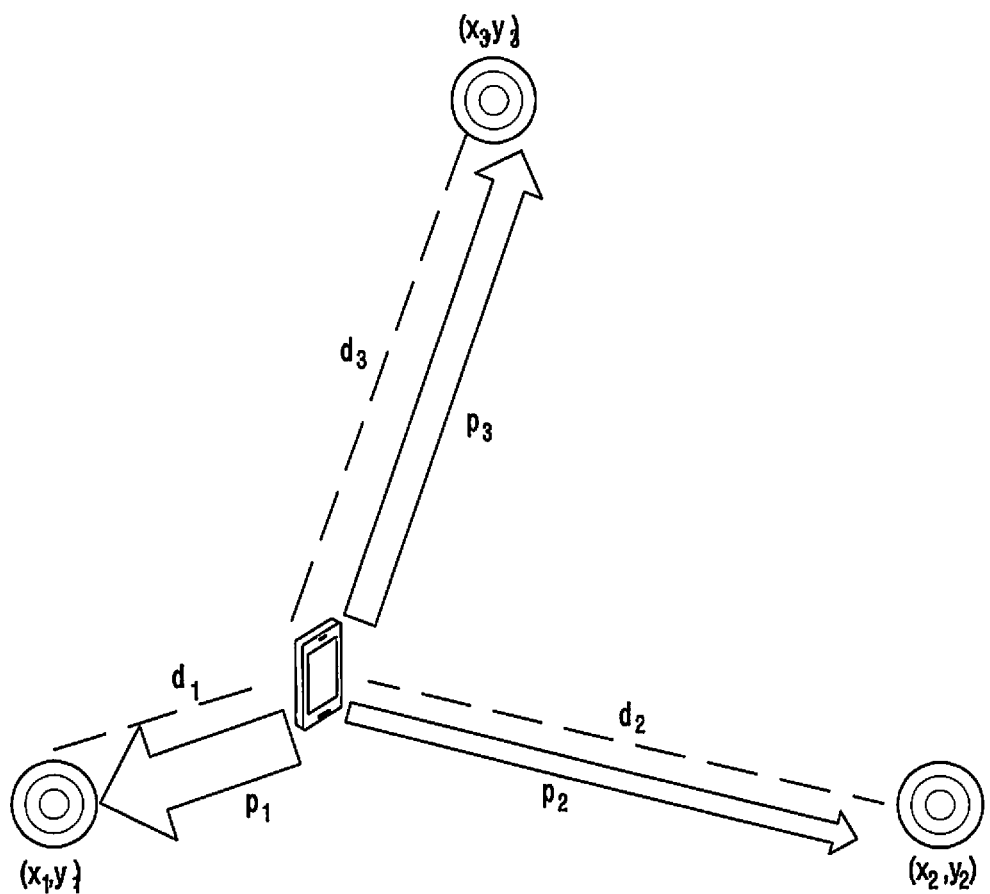
FIG. 7 illustrates an example of determining a distance to neighboring APs by an electronic device according to an exemplary embodiment of the present invention.

For example, as shown in FIG. 7, the AP controller 200 calculates a distance between the electronic device 300 and the AP on the basis of Received Signal Strength Indication (RSSI) received by the AP for the electronic device 300, and estimates each relative distance ratio between the electronic device 300 and the AP. Thereafter, a weight is applied to each coordinate by using a square of the estimated relative distance ratio, and then a centroid for three coordinates to which the weight is applied is determined. Herein, the AP controller 200 may receive RSSI for an uplink signal of the electronic device 300 from a plurality of APs.

Specifically, the AP controller 200 may calculate a distance between the electronic device 300 and the AP on the basis of the RSSI received for the electronic device 300 by each of three or more APs neighboring to the electronic device 300.

If RSSI measured by the AP is greater than or equal to $RSSI_{bp}$, the AP controller 200 may determine RSSI (i.e., signal strength) and d (i.e., distance) by using equation (1) and equation (2) described below. Herein, $RSSI_{bp}$ is RSSI at a break point, and may be calculated as shown in equation (5) below by using a unit distance, optimal RSSI at the unit distance, and a break point distance. In the exemplary embodiment of the present invention, it is assumed that the break point distance is 20 m, the unit distance is 1 m, and the optimal RSSI at the unit distance is −29 dB. Further, it is assumed herein that a path loss slope is 2 in a period before the break point and 3.5 in a period after the break point.

$$RSSI = RSSI_{unit} - 10 \times 2 \times \log_{10}(d/d_{unit}) \quad (1)$$

$$d = d_{unit} \times 10^{(RSSI_{unit} - RSSI)/10 \times 2} \quad (2)$$

Herein, d denotes a distance between the electronic device 300 and the AP, $d_{unit}$ denotes a unit distance, and $RSSI_{unit}$ denotes an optimal RSSI at the unit distance. As described above, $d_{unit}$ and $RSSI_{unit}$ may use pre-set values such as 1 m and −29 dB, respectively.

On the other hand, if RSSI is less than $RSSI_{bp}$, the AP controller 200 may determine RSSI and d by using equation (3) and equation (4) described below.

$$RSSI = RSSI_{bp} - 10 \times 3.5 \times \log_{10}(d/d_{bp}) \quad (3)$$

$$d = d_{bp} \times 10^{(RSSI_{bp} - RSSI)/10 \times 3.5} \quad (4)$$

Herein, d denotes a distance between the electronic device 300 and the AP, $RSSI_{bp}$ denotes RSSI at a break point, $d_{bp}$ denotes a break point distance, and $RSSI_{bp}$ denotes RSSI at the break point. As described above, $d_{bp}$ may be a value pre-set to 20 m, and $RSSI_{bp}$ may be calculated as shown in equation (5) below.

$$RSSI_{bp} = RSSI_{unit} - 10 \times 2 \times \log_{10}(d_{bp}/d_{unit}) \quad (5)$$

The AP controller 200 may calculate a distance d between each AP and the electronic device on the basis of the aforementioned equations, may determine a position of the electronic device 300 by using the calculated distance d, and may determine an AP closest to the electronic device 300.

First, the AP controller 200 may calculate a relative distance ratio (i.e., $p_1$, $p_2$, and $p_3$) between the electronic device 300 and each AP as shown in the following equations (6) and (8) by using the calculated distance d (i.e., $d_1$, $d_2$, and $d_3$).

$$p_1 = 1 - \frac{d_1}{d_1 + d_2 + d_3} \quad (6)$$

$$p_2 = 1 - \frac{d_2}{d_1 + d_2 + d_3} \quad (7)$$

$$p_3 = 1 - \frac{d_3}{d_1 + d_2 + d_3} \quad (8)$$

Herein, $p_i$ denotes a relative distance ratio between an $i^{th}$ AP and the electronic device 300, and $d_i$ denotes a distance between the $i^{th}$ AP and the electronic device 300, which is calculated on the basis of equations (1) to (5). Herein, the relative distance ratio denotes a ratio of a distance between an AP and the electronic device 300 as to a total sum of the distances $d_1$, $d_2$, and $d_3$ between three APs and the electronic device 300.

Thereafter, the AP controller 200 may calculate a temporary coordinate ($x_{temp}$, $y_{temp}$) of the electronic device 300 as shown in the following equations (9) and (10) by using the calculated relative distance ratio. That is, the AP controller 200 may apply a weight to a coordinate of each of the three APs (i.e., ($x_1 P_1^2$, $y_1 P_1^2$), ($x_2 P_2^2$, $y_2 P_2^2$), ($x_3 P_3^2$, $y_3 P_3^2$)) by using the relative distance ratio, and thereafter may calculate a centroid for the coordinates to which the weight is applied, and may set it as a temporary coordinate of the electronic device 300. In this case, it is assumed that a coordinate $(x_1, y_1)$ of a first AP, a coordinate $(x_2, y_2)$ of a second AP, and a coordinate $(x_3, y_3)$ of a third AP are stored in the AP controller 200.

$$x_{temp} = \frac{x_1 \times p_1^2 + x_2 \times p_2^2 + x_3 \times p_3^2}{p_1^2 + p_2^2 + p_3^2} \qquad (9)$$

$$y_{temp} = \frac{y_1 \times p_1^2 + y_2 \times p_2^2 + y_3 \times p_3^2}{p_1^2 + p_2^2 + p_3^2} \qquad (10)$$

The AP controller 200 may calculate a temporary coordinate of the electronic device 300, and thereafter may compare the calculated temporary coordinate with a coordinate of each AP to determine whether the electronic device 300 is the closest to a certain AP. According to whether it is the closest to the certain AP, a coordinate (x, y) of the electronic device 300 may be determined as shown in the following equations (11) and (12).

$$x = \frac{x_{temp} + x_i}{2} \qquad (11)$$

$$y = \frac{y_{temp} + y_i}{2} \qquad (12)$$

Herein, i denotes an index for identifying an AP. According to the exemplary embodiment of the present invention, i may be 1, 2, or 3. That is, $x_i$ and $y_i$ denote coordinates x and y indicating a position of an $i^{th}$ AP.

For example, if the calculating of the temporary coordinate of the electronic device 300 results in that the position of the electronic device 300 is the closest to the first AP, the AP controller 200 may determine the coordinate of the electronic device 300 by using the following equation.

$$x = \frac{x_{temp} + x_1}{2} \qquad (13)$$

$$y = \frac{y_{temp} + y_1}{2} \qquad (14)$$

The AP controller 200 may determine an AP closest to a position of the electronic device on the basis of a finally determined coordinate or the temporary coordinate determined for the electronic device 300 on the basis of the aforementioned equations.

Thereafter, in step 607, the AP controller 200 confirms whether the AP closest to the electronic device 300 is the same AP as a currently connected AP.

If the AP closest to the electronic device 300 is the same AP as the currently connected AP, returning to step 603, the AP controller 200 repeats the subsequent steps. In other words, if the AP currently connected to the electronic device 300 is the AP closest to the electronic device 300, the AP controller 200 may maintain a current connection with the AP, and may not attempt a connection to other APs.

Otherwise, if the AP closest to the electronic device 300 is not the same AP as the currently connected AP, in step 609, the AP controller 200 may release the connection of the AP currently connected to the electronic device 300. Specifically, if the currently connected AP is different from the AP determined to be the closest to the electronic device 300, the AP controller 200 may transmit a connection release message to the AP currently connected to the electronic device 300 to release the connection between the electronic device 300 and the AP. For example, in a state where the electronic device 300 is connected to the first AP, if it is determined that the AP closest to the electronic device 300 is the second AP, the AP controller 200 may transmit a connection release message to the first AP currently connected to the electronic device 300 to release the connection between the electronic device 300 and the first AP.

Thereafter, in step 611, the AP controller 200 may receive, from a specific AP, information indicating that a connection is made to the electronic device 300. In other words, the AP controller 200 may receive, from an AP connected to the electronic device 300 among one or more APs managed and controlled by the AP controller 200, the information indicating that the connection is made to the electronic device 300.

Thereafter, in step 613, the AP controller 200 confirms whether the specific AP is the AP closest to the electronic device 300. In this case, when a connection is made to the electronic device 300, the AP controller 200 may transmit to all APs managed and controlled by the AP controller 200 a message for requesting to transmit the information indicating that the connection is made to the electronic device 300.

If the specific AP is the AP closest to the electronic device 300, the AP controller 200 ends the procedure according to the exemplary embodiment of the present invention. In other words, if the information indicating that the connection is made to the electronic device 300 is received from the specific AP, the AP controller 200 determines that the electronic device 300 is connected to the AP closest to the electronic device 300, and thus does not release the connection.

Otherwise, if the specific AP is not the AP closest to the electronic device 300, returning to step 609, the AP controller 200 may repeat the subsequent steps.

A method has been described above for connecting an electronic device to an AP closest to a position of the electronic device when a positional movement of the electronic device is detected by an AP controller. However, the present invention described above may be performed periodically irrespective of the positional movement of the electronic device, and may be performed whenever a pre-set event occurs. For example, a function for connecting a specific electronic device to an AP closest to a position thereof may be performed when an AP which reports information regarding the specific electronic device to the AP controller is changed.

Figure 8:
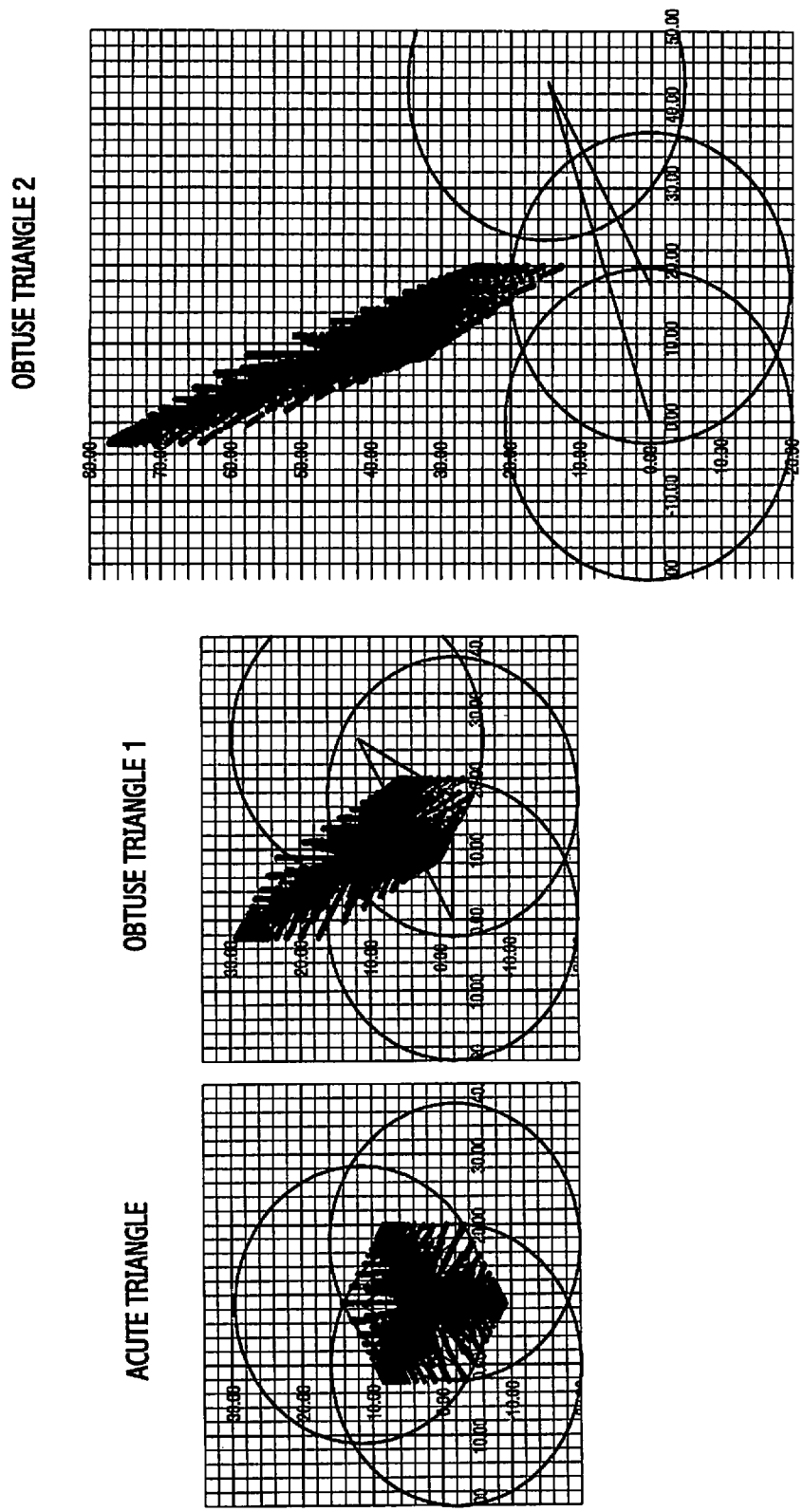
FIG. 8 illustrates an error which occurs when a position of an electronic device is determined by the conventional AP controller by using a triangulation.
Figure 9:
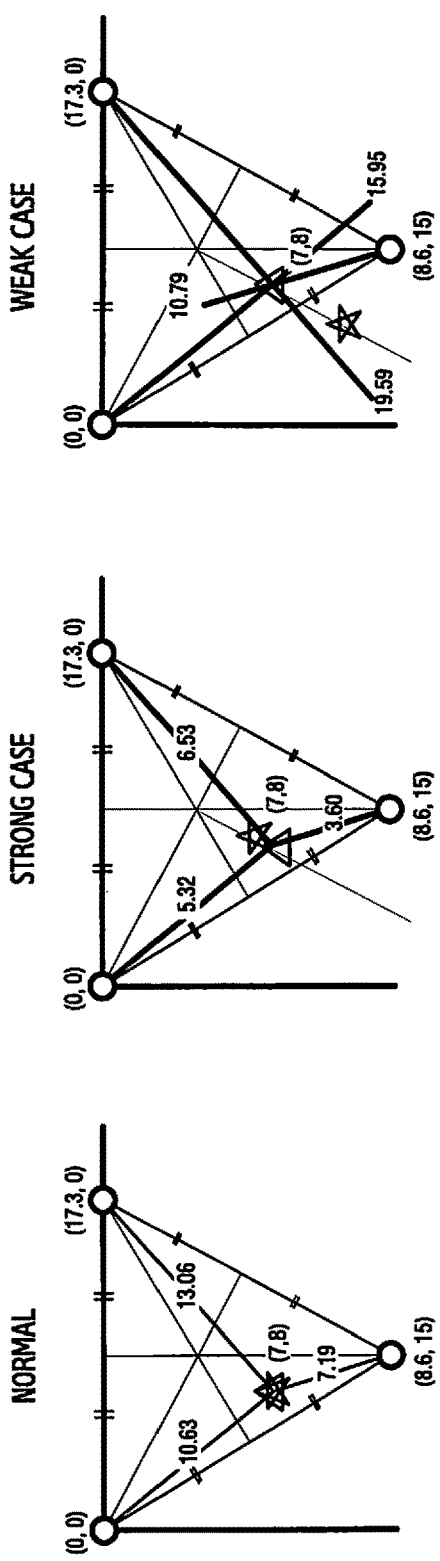
FIG. 9 illustrates an error which occurs when a position of an electronic device is determined by the conventional AP controller by using Received Signal Strength Indication (RSSI)
Figure 10:
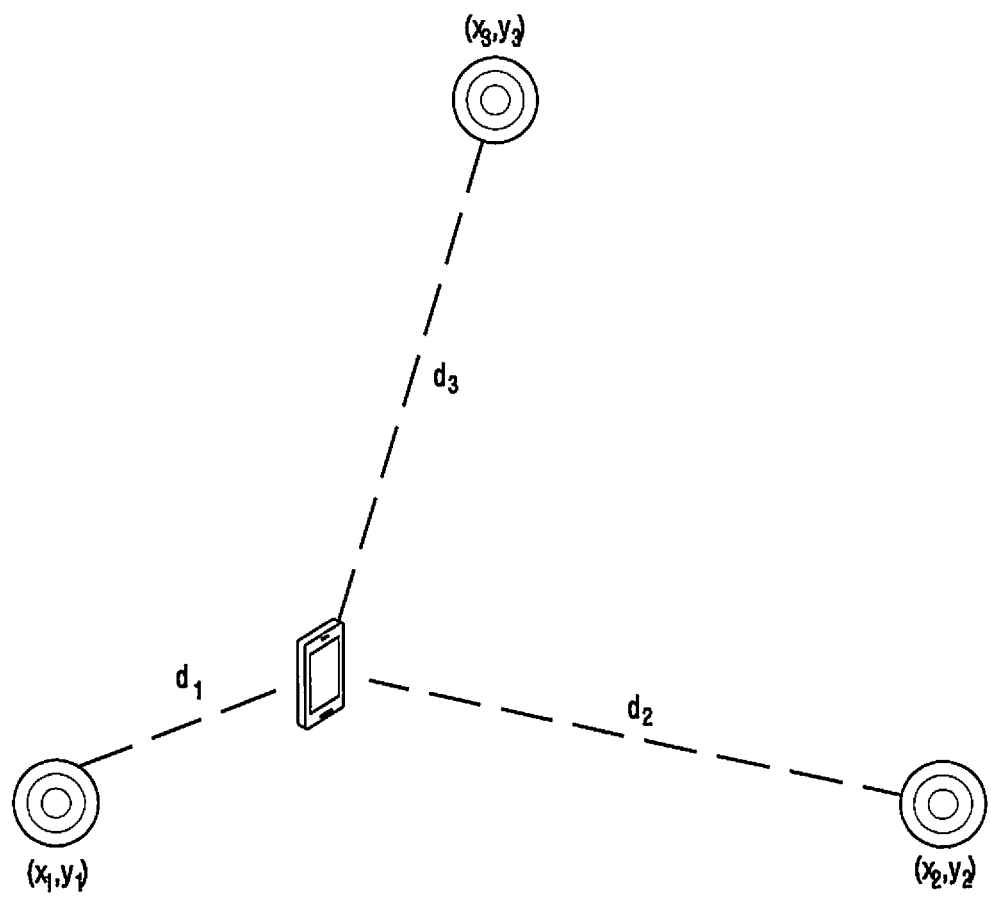
FIG. 10 illustrates an example of determining a position of an electronic device by using a centroid of three coordinates to which a weight is applied on the basis of RSSI for the electronic device by an AP controller according to an exemplary embodiment of the present invention.
Figure 11:
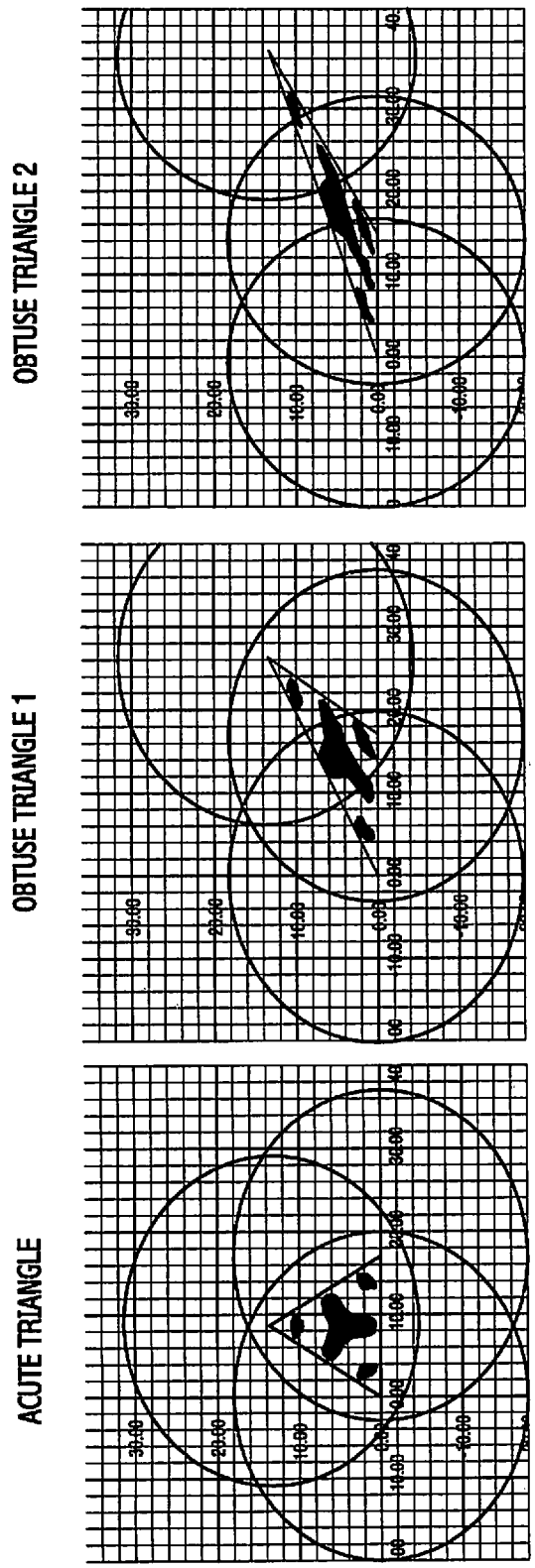
FIG. 11 illustrates an example of an error which occurs when a position of an electronic device is determined by using a centroid of three coordinates to which a weight is applied on the basis of RSSI for the electronic device by an AP controller according to an exemplary embodiment of the present invention.

A method has been described above for determining a position of an electronic device by using a centroid of three coordinates to which a weight is applied on the basis of RSSI for the electronic device. However, the present invention described above is not limited thereto, and thus well-known techniques may be used to determine the position of the electronic device. For example, the position of the electronic device may be determined by using the RSSI for the electronic device and a triangulation for calculating position information on the basis of three or more AP positions. When the AP controller determines the position of the electronic device by using the triangulation, there is an error range as shown in FIG. 8. That is, when the position of the electronic device is determined by using the triangulation, an error range for estimating the position of the electronic device is increased if positions at which three APs are installed form an obtuse triangle. The error range is decreased when a triangle formed by the positions at which the three APs are installed is similar to an equilateral triangle. Further, when the AP controller determines the position of the electronic device by using the RSSI for the electronic device, there is an error range as shown in FIG. 9. That is, when the position of the electronic device is determined by using the RSSI, the higher the RSSI strength, the greater the error range is, and the lower the RSSI strength, the smaller the error range is. On the other hand, as shown in FIG. 10, according to the aforementioned exemplary embodiment of the present invention, when the AP controller determines the position of the electronic device by using a centroid of three coordinates to which a weight is applied on the basis of the RSSI for the electronic device, as shown in FIG. 11, an error range may be significantly small irrespective of a structure of the three APs and the RSSI strength.

Embodiments and all of the functional operations of the present invention described in this specification may be implemented in computer software, firmware, or hardware, including the structures disclosed in this specification and their structural equivalents, or in combinations of one or more of them. Further, the embodiments of the present invention described in this specification may be executed by one or more computer program products, i.e., an electronic device, a data processing device, etc., or may be implemented in one or more modules of computer program instructions encoded on a computer readable medium for controlling an operation of these devices.

The computer readable medium may be a machine-readable storage medium, a machine-readable storage substrate, a memory device, a composition of matter effecting a machine-readable propagated stream, or a combination of one or more of them. The term "data processing device" includes, for example, a programmable processor, a computer, or multiple processors or all apparatus, devices, and machines for processing data, including the computer. The apparatus may include, in addition to hardware, code that generates an execution environment for the computer program, e.g., code that constitutes processor firmware, a protocol stack, a database management system, an operating system, or a combination of one or more of them.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method of controlling an access point (AP) connection by an AP controller, the method comprising:
    detecting a movement of an electronic device connected to a first AP among a plurality of APs;
    calculating a distance between each of the APs and the electronic device on the basis of received signal strength indication (RSSI) measured at each of the APs;
    calculating a relative distance between each of the APs and the electronic device on the basis of the calculated distance;
    calculating a position of the electronic device based on a ratio of the relative distance between each of the plurality of APs and the electronic device;
    determining an AP closest to the position of the electronic device; and
    if the determined AP is different from the first AP, releasing a connection between the electronic device and the first AP,
    wherein the relative distance is calculated by using a ratio of a distance between each of the APs and the electronic device against a total sum of all distances between each of the APs and the electronic device.

2. The method of claim 1, further comprising, if the determined AP and the first AP are identical to each other, maintaining the connection between the electronic device and the first AP.

3. The method of claim 1, further comprising:
    after the releasing of the connection between the electronic device and the first AP, receiving from a second AP a message indicating that a connection is made to the electronic device;
    confirming whether the second AP is identical to the determined closest AP; and
    if the second AP is different from the determined closest AP, transmitting to the second AP a message for requesting to release the connection with the electronic device.

4. The method of claim 1, wherein the determining of the AP closest to the position of the detected electronic device comprises:
    calculating the distance between each of the APs and the electronic device on the basis of received signal strength indication (RSSI) measured at each of the APs as to an uplink signal of the electronic device;
    estimating a position coordinate of the electronic device on the basis of the calculated distance; and
    determining the AP closest to the position of the electronic device on the basis of the estimated position coordinate and a coordinate of each of the three or more APs.

5. The method of claim 4, further comprising, if the AP closest to the position of the electronic device is determined, determining a coordinate of the electronic device on the basis of the temporary coordinate of the electronic device and a coordinate of the closest AP.

6. The method of claim 1, wherein the releasing of the connection between the electronic device and the first AP to make the electronic device connect to the determined AP comprises transmitting to the first AP a message for requesting to release the connection with the electronic device.

7. An access point (AP) controller apparatus for controlling an AP connection, the apparatus comprising:
    a transceiver; and
    a processor configured to:
        detect a movement of an electronic device connected to a first AP among a plurality of APs,
        calculate a distance between each of the APs and the electronic device on the basis of received signal strength indication (RSSI) measured at each of the APs;
        calculate a relative distance between each of the APs and the electronic device on the basis of the calculated distance;
        calculate a position of the electronic device based on a ratio of a relative distance between each of the plurality of APs and the electronic device,
        determine an AP closest to the position of the electronic device, and
        release a connection between the electronic device and the first AP, if the determined AP is different from the first AP, wherein the relative distance is calculated by using a ratio of a distance between each of the APs and the electronic device against a total sum of all distances between each of the APs and the electronic device.

8. The apparatus of claim 7, wherein the processor maintains the connection between the electronic device and the first AP, if the determined AP and the first AP are identical to each other.

9. The apparatus of claim 7, wherein the processor controls the transceiver to receive from a second AP a message indicating that a connection is made to the electronic device after the releasing of the connection between the electronic device and the first AP, confirms whether the second AP is identical to the determined closest AP, and thereafter if the second AP is different from the determined closest AP, and controls to transceiver to transmit to the second AP a message for requesting to release the connection with the electronic device.

10. The apparatus of claim 7, wherein the processor calculates the distance between each of three or more APs and the electronic device on the basis of received signal strength indication (RSSI) measured at each of the APs as to an uplink signal of the electronic device, estimates a position coordinate of the electronic device on the basis of the calculated distance, and determines the AP closest to the position of the electronic device on the basis of the estimated position coordinate and a coordinate of each of the three or more APs.

11. The apparatus of claim 10, wherein if the AP closest to the position of the electronic device is determined, the processor determines a coordinate of the electronic device on the basis of the temporary coordinate of the electronic device and a coordinate of the closest AP.

12. The apparatus of claim 7, wherein the processor controls the transceiver to transmit to the first AP a message for requesting to release the connection with the electronic device.

* * * * *